US 6,692,403 B2

(12) United States Patent
Charaudeau et al.

(10) Patent No.: US 6,692,403 B2
(45) Date of Patent: Feb. 17, 2004

(54) SERIES HYBRID VEHICLE CAPABLE OF OPERATING WITHOUT A BATTERY

(75) Inventors: Jean-Jacques Charaudeau, Cottens (CH); Pierre-Alan Magne, Belfaux (CH)

(73) Assignee: Conception et Developpement Michelin S.A., Givisiez (CH)

( * ) Notice: Subject to any disclaimer, the term of this patent is extended or adjusted under 35 U.S.C. 154(b) by 0 days.

(21) Appl. No.: 10/097,021

(22) Filed: Mar. 13, 2002

(65) Prior Publication Data

US 2002/0183161 A1 Dec. 5, 2002

(30) Foreign Application Priority Data

Mar. 14, 2001 (FR) .............................. 01 03494

(51) Int. Cl.⁷ .............................. B60K 1/02; B60K 1/00
(52) U.S. Cl. ................................ 477/3; 477/7; 477/27; 180/65.4; 180/65.5; 180/65.8
(58) Field of Search .............................. 477/3, 4, 7, 27, 477/29; 180/65.2, 65.3, 65.4, 65.5, 65.8

(56) References Cited

U.S. PATENT DOCUMENTS

| | | | |
|---|---|---|---|
| 5,761,028 A | * 6/1998 | Donegan et al. | 361/679 |
| 5,826,673 A | * 10/1998 | Bates et al. | 180/165 |
| 5,935,040 A | 8/1999 | Tabata et al. | 477/3 |
| 5,993,351 A | 11/1999 | Deguchi et al. | 477/5 |
| 6,104,148 A | * 8/2000 | Kumar et al. | 318/52 |
| 6,155,954 A | 12/2000 | Itoyama et al. | 477/5 |
| 6,163,121 A | * 12/2000 | Kumar et al. | 318/434 |
| 6,359,346 B1 | * 3/2002 | Kumar | 290/40 A |
| 6,484,830 B1 | * 11/2002 | Gruenwald et al. | 180/65.2 |

FOREIGN PATENT DOCUMENTS

EP           10221821 A1 *  7/2000  ............ B60K/6/02

OTHER PUBLICATIONS

Translation of EP 1022182A1.*

* cited by examiner

*Primary Examiner*—Tisha D. Lewis
(74) *Attorney, Agent, or Firm*—Baker Botts L.L.P.

(57) ABSTRACT

A series hybrid vehicle comprising an engine driving an alternator, the engine having a power available at the output shaft of the engine, at least one electric traction motor connected to the alternator by an electric line and an inverter, the inverter allowing the electric traction motor to be operated at a desired torque, the electric line allowing the transfer of an electric traction power, an accelerator control CA at the disposal of the vehicle driver, an actuator acting on the engine, a control device controlling the position of the actuator as a function of the position of the accelerator control, as far as a limitation at least when the desired torque reaches the maximum torque of the electric traction motor, a unit for controlling the propulsion torque of the vehicle, allowing the desired torque to be continuously calculated, in accordance with a chosen sampling period, as a function of the vehicle speed and as a function of a control power P evaluating the power available at the output shaft of the engine as a function of the actual speed of the engine.

11 Claims, 5 Drawing Sheets

SERIES HYBRID VEHICLE CAPABLE OF OPERATING WITHOUT A BATTERY

BACKGROUND OF THE INVENTION

1. Technical Field of the Invention

The present invention relates to road motor vehicles with series hybrid motorization.

2. The Related Art

In vehicles of this type, an engine drives an electric alternator which converts the mechanical energy available at the shaft of the engine into electrical energy. This electrical energy supplies one or more electric traction motors, mechanically connected to the driving wheels of the vehicle. The engine is not mechanically connected to the wheels, unlike vehicles with parallel hybrid motorization, in which an engine and an electric motor are both mechanically connected to the driving wheels, the torques which they deliver being able to be added together to drive the driving wheels.

Drivers of motor vehicles with conventional motorization (the expression "conventional motorization" is intended here to mean an engine and a gearbox, manual or automatic) are familiar with the acceleration and braking controls which are well known in the prior art. These controls have attained a high degree of progressivity and reactivity. It is desirable for a hybrid vehicle to be able to be driven substantially in the same way as a conventional motorization vehicle, so as not to confuse a driver used to conventional motorization. It is therefore a question of being able to transform the actions of a driver on the accelerator pedal, and more generally on the accelerator and brake pedals, into judicious actions on the regulation of the drivetrain starting from the engine and ending at one or more electric traction motors.

It is well known to install an electric storage battery as a buffer between the alternator and the electric motor, in particular where it is desired to be able to drive the vehicle in purely electric mode, with the engine switched off. In this case, the regulation of the engine and the control (in the electrical sense of the term) of the electric traction motor can be independent. There is no particular problem with controlling the torque of an electric motor, which draws its energy from an electric storage battery, with all the desired progressivity and reactivity to the accelerator pedal at the disposal of the driver.

However, the use of an electric storage battery presents various problems. Such a battery has a high mass compared with the amount of electrical energy stored. This considerably increases the mass of a vehicle and is a source of waste during acceleration, not to mention the problems with the dynamic behavior of a vehicle, which are all the more crucial if the vehicle is heavy. Moreover, such batteries present maintenance problems and environmental problems on account of the numerous pollutants which they contain and which are difficult to recycle.

The object of the present invention is therefore to design a series hybrid drivetrain which can eventually operate without an electric storage battery, while affording the vehicle driver a very progressive and very reactive accelerator control. Where there is no electrical energy store (battery), it is necessary to be able to produce just the electrical energy necessary to cover the demand. The problem which arises is therefore to obtain the torque required at the electric traction motor while avoiding stalling or racing of the engine, and to do this by means of a control whose progressivity and reactivity are as close as possible to those of an accelerator pedal of a conventional thermal vehicle.

SUMMARY OF THE INVENTION

The invention proposes a drivetrain for a series hybrid vehicle comprising:
- an engine driving an alternator, the engine having a power available at the output shaft of the engine;
- at least one electric traction motor connected to an alternator by an electric line and an inverter, the inverter allowing the electric traction motor to be operated at a desired torque, the electric line allowing the transfer of an electric traction power;
- an accelerator control CA at the disposal of the vehicle driver;
- an actuator acting on the engine;
- a control device controlling the position of the actuator as a function of the position of the accelerator control, as far as a limitation at least when the desired torque reaches the maximum torque of the electric traction motor; and
- a unit for controlling the propulsion torque of the vehicle, allowing the desired torque to be continuously calculated as a function of the vehicle speed and as a function of a control power evaluating the power available at the output shaft of the engine as a function of the actual speed of the engine.

The engine may be of any type which can be controlled by a variable control such as an accelerator pedal. For example, diesel engines are known in which the control acts on the amount of fuel injected into the combustion chamber. Petrol engines are also known in which the control acts on the amount of air admitted into the combustion chamber. These examples are not limiting. The fuel injection control of a diesel engine, as well as the throttle control of a petrol engine, are an "actuator PP" in the context of the present invention.

As for the electric traction motor, there may be one or more of them, for example one per vehicle wheel. If there are a plurality of electric traction motors, "desired torque C" is to be understood as a combined overall torque for all the motors, the present invention not being concerned with the question of the distribution of the torque between the motors. As for the type of electric motor, this is a motor whose torque delivered to the rotary shaft can be controlled in terms of amplitude and sign. For example, a Permanent Magnet Synchronous Motor (PMSM) is used, with flux concentration.

The alternator used is, for example, an electric machine of the same type as that proposed for the electric traction motor. The alternator converts the mechanical energy available at the output shaft of the engine into electrical energy consumed by the electric load connected to the electric line fed by the alternator (for this disclosure, the electric load is mainly the electric traction motor(s)).

The control power P comes from an evaluation of the available power $P_{thd}$ originating from the engine. The control power P does not matching exactly the actual available power $P_{thd}$. Various curves for control power as a function of the actual speed R will be given below, which curves are superimposed on the real curves for the available power $P_{thd}$ for various positions of the actuator PP. Since the control power P comes from an approximation of reality to a greater or lesser extent, the operating point of the engine giving a particular power as a function of the actual engine speed R does not necessarily correspond to an equilibrium between the actually available power $P_{thd}$ and the power consumed in electrical form by the loads connected to the alternator. The calculation of the desired torque C is carried out by successive iterations. As long as there is a difference between the power delivered by the engine and the power consumed in electrical form, the speed of the engine changes, and therefore the evaluation of the actually available power $P_{thd}$ changes. The next iteration of the calculation of the desired torque C by the control unit determines a new value for the desired torque C, thereby bringing about a variation of the electric power consumed by the loads connected to the alternator, which tends to reduce the difference, and so on until the difference is eliminated.

It will be explained below how a curve for control power (called more simply "control curve" below) as a function of the actual speed R can be chosen so that the electric power consumed by the loads connected to the alternator tends to balance the available power.

It should be pointed out that, according to one aspect of the present invention, the accelerator control CA at the disposal of the driver does not act directly on the desired torque C of the electric traction motor. It acts on the engine. The desired torque C of the electric traction motor is automatically adapted to the actual operation of the engine. Thus, the accelerator control CA acts directly on the actuator PP. The actuator PP also takes account of the torque absorbed by the electric traction motor, since this is necessarily limited, otherwise the electric motor would be destroyed in the event of excessively strong current. This is because, at low vehicle displacement speed, saturation (maximum current admissible by the electric motor and by the inverter) is reached for low power levels. To avoid racing of the engine, it is advisable to limit the demand for acceleration coming from the driver. It is only below saturation of the electric motor that the control of the actuator PP may be linked, for example proportionally, to the accelerator control CA on which the driver acts directly.

Of course, to the extent that electrical energy is available on the electric line mentioned, it may be envisaged to connect various electric loads other than the electric traction motor(s). In certain cases, if only in a transitory phase, these other electric loads may absorb considerable electric power, sometimes more than the electric traction motor, and even more than the available power. In this case, it is advisable to make various adjustments to the regulation principle explained above, which will be dealt with hereinbelow.

BRIEF DESCRIPTION OF THE DRAWINGS

Other specific desires, such as the search for lower consumption of the engine, or some other possible improvements, will also be mentioned in the following description of a non-limiting example, with reference to the attached drawing in which.

DESCRIPTION OF ILLUSTRATIVE EMBODIMENTS

Figure 1:
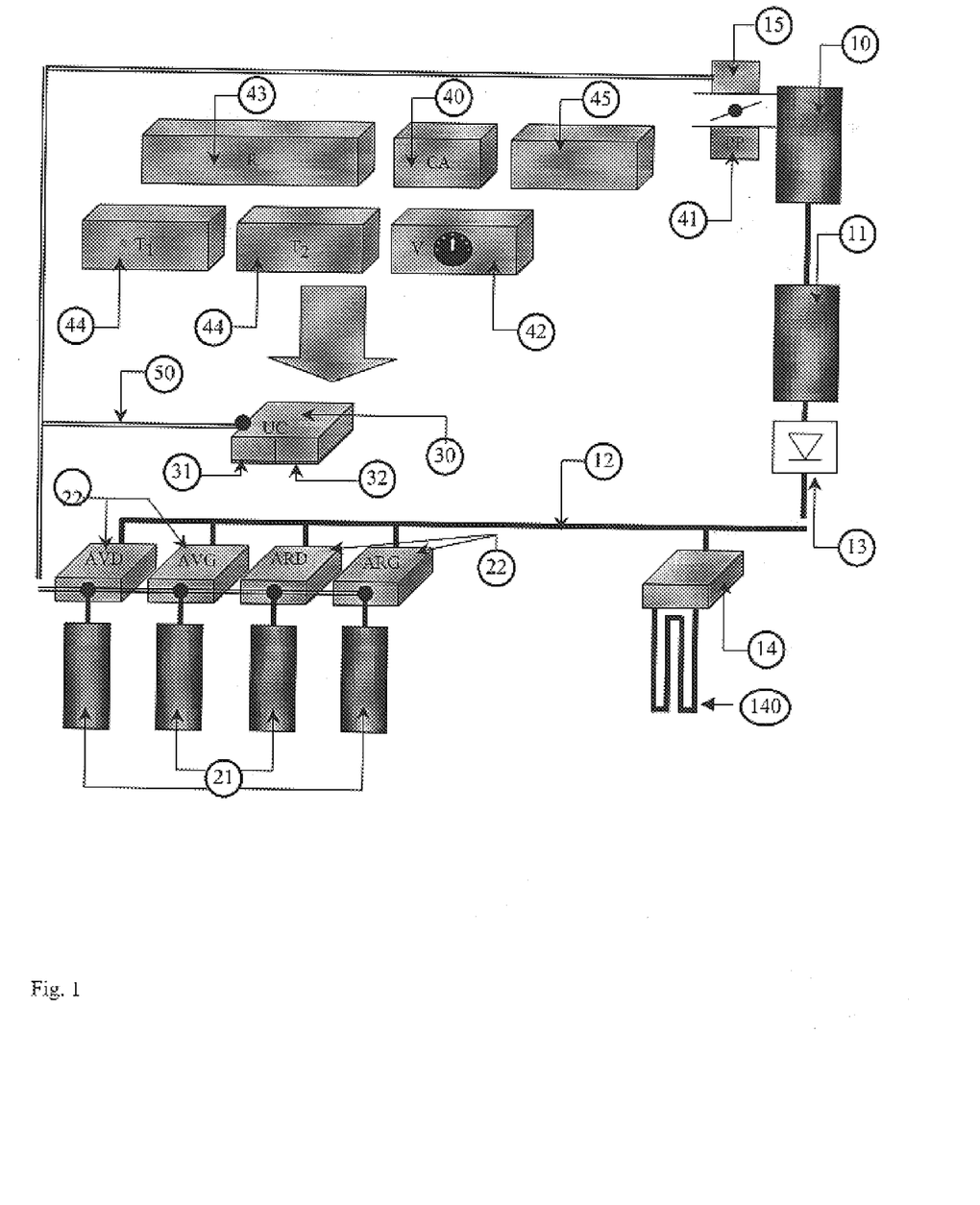
FIG. 1 is a general diagram of a drivetrain for a series hybrid vehicle according to the invention.

In FIG. 1, there can be seen a petrol-type engine 10, and an actuator 15 controlling the position of a throttle in an air inlet manifold. The engine drives an alternator 11. The electrical energy supplied by the alternator 11 is distributed to four electric traction motors 21, via a rectifier 13, an electric line 12, and one inverter 22 per motor 21. An electrical energy absorption device 14 is connected to the electric line 12.

A central processing unit 30 manages various functions, including the electric drivetrain of the vehicle (driving or braking torque of the electric motors 21). The central processing unit 30 comprises a unit 31 for controlling the propulsion torque of the electric motors 21 and an electronic device 32 for controlling the actuator 15 acting on the position of the throttle PP, thereby acting on the power developed by the engine 10. The unit 31 for controlling the vehicle propulsion torque calculates the said desired torque in accordance with a chosen sampling period. The central processing unit 30 receives signals for evaluation for various parameters, such as a potentiometer 40 reflecting the position of an accelerator control CA (a pedal or other equivalent control at the disposal of the vehicle driver), such as a sensor 41 reflecting the position of the throttle PP, a sensor 42 giving the vehicle speed v, a sensor 43 giving the speed R of the engine, various temperature sensors 44, a sensor 45 giving the pressure of the hydraulic braking circuit of the vehicle, the list not being exhaustive.

In an actual vehicle, other peripheral elements absorb the power delivered by the engine. As far as the present invention is concerned, it is of little importance whether they draw mechanical power directly from the crankshaft of the engine or whether they draw electric power from the electric line 12, since this amounts to drawing power from the crankshaft via the alternator. It should merely be pointed out that some of these peripheral elements may also be managed by the central processing unit 30, thereby affording the advantage of being able to take account of the consumed power variations in the device 32 for controlling the actuator 15 even before the speed of the engine has been able to be modified thereby.

The electric traction motors 21 are three-phase synchronous motors equipped with an angular position sensor of the resolver type and are controlled by the inverters 22, under the control of the unit 31 for controlling the propulsion torque. The electronics are designed to control the motors in terms of torque. Consequently, the traction assembly can be used as a drive and as a brake.

The actuator 15 essentially consists of a small DC electric motor coupled to the throttle of the engine. This motor is managed by electronics and, by virtue of a position sensor 41 (potentiometer), the throttle is continuously controlled in terms of position. The generated throttle position depends of course on the torque desired for the electric traction motor (which torque may be negative), and is also adapted as a function of possible excessive consumption by peripheral elements.

A CAN® bus 50 (Controller Area Network) provides the interconnection of the various elements. This allows the central processing unit 30, chosen as the master of the network, to receive in particular the speed of the wheel driven by the electric motor 21 and diagnostics on the operation from the inverters 22, and to transmit a desired torque C to the inverters 22.

The management of the operation of the drivetrain will now be described. The sensor 40 giving the position of the accelerator pedal delivers a signal which allows the following functions to be performed: normal acceleration, maximum possible acceleration (comparable to the so-called "kick-down" position in conventional vehicles with an automatic gearbox), and engine braking. The operation in engine braking mode will be left aside for the moment.

Figure 2:
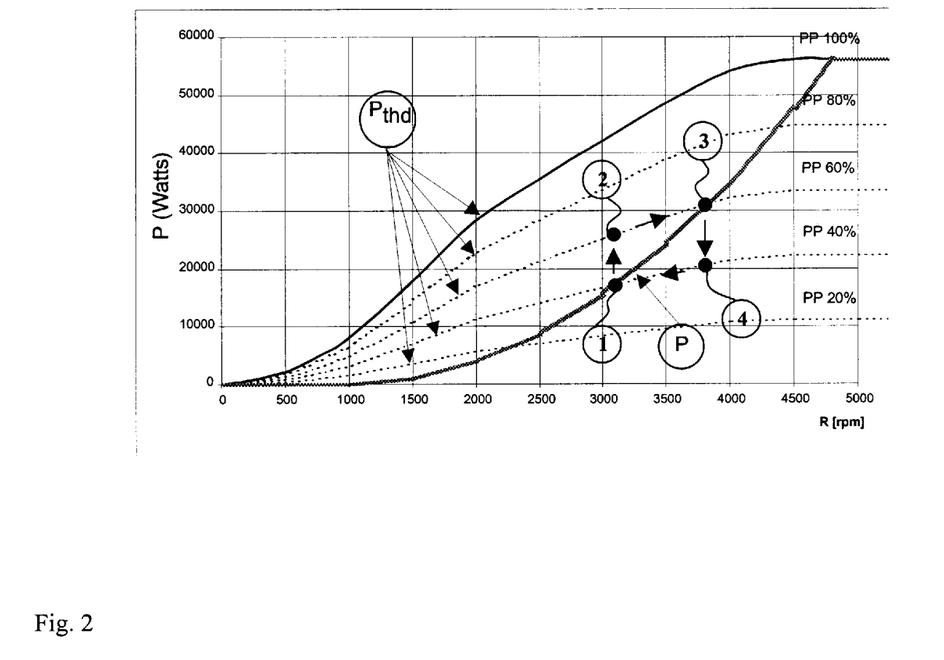
FIG. 2 is a graph showing the power of the engine as a function of its rotational speed, for various values of the actuator PP.

In FIG. 2, there can be seen a set of curves representing the actual power $P_{thd}$ of the engine, in steady state, for various positions of the throttle. These curves are representative of actual characteristics of a petrol engine of a passenger car. The central processing unit 30 does not contain any programmed instruction representative of these actual characteristics. Furthermore, there can be seen a control curve P for the electric traction (control power). This curve shows programmed instructions in the unit 31 for controlling the propulsion torque.

Let us examine various situations. These are based on the assumption that there is a steady state, any steady state but far from the current saturation of the traction motors, and ignoring the energy consumption by peripheral elements. Under these conditions, for a certain position of the throttle, the engine delivers a certain power which must be consumed by the electric traction motors 21 for the system to be in equilibrium. For example, at 3100 rpm and for a throttle opening at 40%, the engine delivers 18000 watts (operating point ①), and the desired torque C which balances the system is the available power divided by the vehicle speed.

If there is no equality between the available power and the consumed electric power resulting from the controlled desired torque C, the speed of the engine will change. For a control curve P such as that of FIG. 2, it is noted that there is self-regulation.

Let us assume that the starting point is the operating point ① mentioned above. When the accelerator pedal is depressed, the control device 32 orders the actuator 15 to open the throttle further. To fix the ideas, if the throttle is adjusted to an opening of 60% following the action of the driver on the accelerator, at the initial speed of 3100 rpm, the engine actually supplies 27000 watts (operating point ②). At the initial instant, with the electric power consumed by the traction not having changed, the electric power consumed by the traction is lower than the power supplied by the engine. The speed of the engine 10 will therefore increase. As soon as the speed increases, the desired value calculated for the torque C increases automatically, as determined by the control curve P for the electric traction. The latter gives a new value of the power to be absorbed by the electric traction motors 21, thereby immediately giving a new desired torque C in view of the vehicle speed. It can be seen that the engine will stabilize at a speed of 3800 rpm (operating point ③, at the intersection of the control curve P and the actual characteristic curve of the engine for a throttle opening at 60%), at which speed the electric power consumed by the traction is equal to the power supplied by the engine, i.e. 31000 watts.

Let us imagine that the position of the throttle is returned to an opening of 40%. At the initial speed of 3800 rpm, the engine can now supply only 21000 watts (operating point ④). With the electric power consumed by the traction having remained greater than the power supplied by the engine, the latter will loose revolutions and stabilize at a speed of 3100 rpm (operating point ①, at the intersection of the control curve P and the actual characteristic curve of the engine for a throttle opening at 40%), at which speed the electric power consumed by the traction is equal to the power supplied by the engine, i.e. 18000 watts.

By this principle, it is ensured that the power is only consumed when it is actually available (no stalling or racing of the engine). The operation of the drivetrain is stable, since, for a control curve P for the electric traction such as shown in FIG. 2, even without knowing the actual characteristics of the engine (these may change over time, especially as a function of wear), at each position of the throttle, there is a single operating point on the control curve P. In other words, it is advantageous (since it is a way of guaranteeing permanently stable operation) that, for all the positions of the actuator PP, the control power curve P chosen should have a single intersection with the curve for the power which is actually available $P_{thd}$. Preferably, the control curve P chosen meets the curve for the actual characteristics of the engine for a throttle opening of 100% at the speed of the engine for maximum power.

For low vehicle speeds, we have seen that it is not possible to consume all the available power, since, as already explained, the electric motors are limited in terms of current, and therefore in terms of torque. More generally, there could be other causes for the limitation of the torque of the electric traction motor. The example of a traction control system may be mentioned.

Advantageously, in order to improve the operating efficiency of the system, the limit value of the throttle position may be adapted by the following corrector: the means for controlling the actuator 15 continuously calculate, at each iteration, a limit position as follows:

Throttle position limit=Max. throttle position$-k*(P_{thd}-P_a-P_t)$.

The term $P_t$ is the power used for the traction of the vehicle and the term $P_a$ is an additional power, not used for the traction. The power consumption by the peripheral elements has already been mentioned. It is advantageous also to take account of various losses as will be explained below. The losses and the power consumed by the peripheral elements together constitute the additional power referred to here.

We have seen that the calculation of the desired torque C on the basis of the control power P always converges towards a stable operation. A person skilled in the art will have appreciated that convergence is all the more rapid since it is possible to better take account, in the calculation, of the causes of variations of power other than those resulting from the actions of the vehicle driver. In this version, it is proposed to take account of an additional power not used for the traction (term $P_a$). The losses are the sum of the iron losses, of the Joule's heat losses, at the alternator and electric traction motor, of the losses in the inverters, at the rectifier, and other losses as well. All these losses of the electrical elements mentioned may be modeled (measurements, experimentations, calculations, ... ). This modeling may be loaded into the central processing unit 30, and the measurement or knowledge of the various parameters, such as the operating temperature of the various elements, the rotational speeds, the electric currents, the desired torque C, allow a term $P_a$ (Additional power) to be calculated at each iteration.

The operation according to the control curve P as set out above may be termed dynamic, because it ensures an excellent response to the accelerator, a little like over the shortest speed ratios with a conventional vehicle with a mechanical gearbox.

Figure 3:
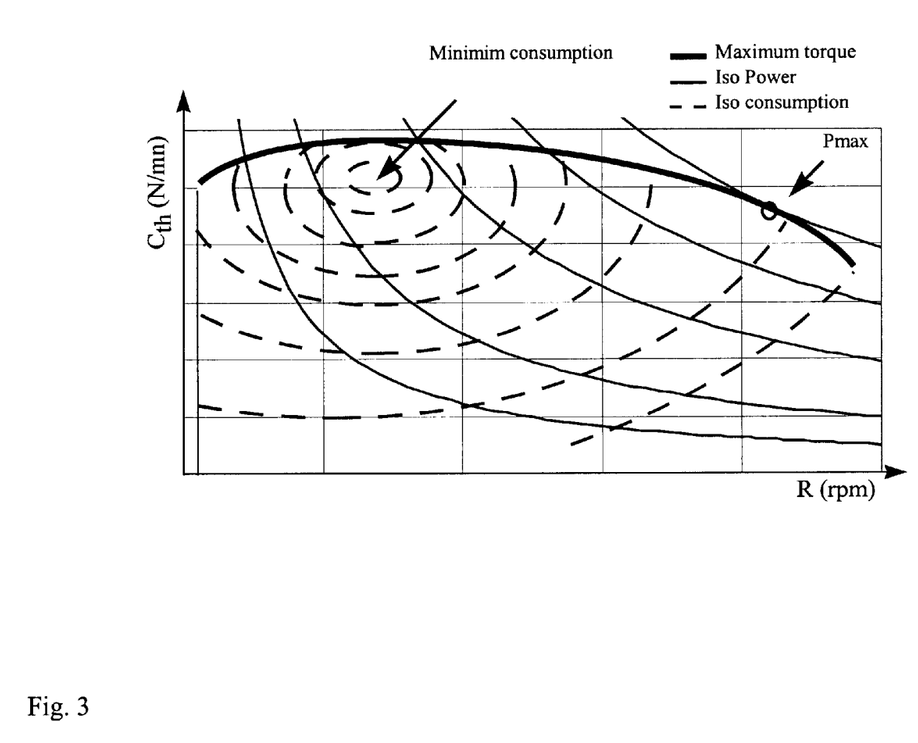
FIG. 3 is a chart representing the iso-consumptions in a graph showing the torque of the engine as a function of its rotational speed.

But it is known, furthermore, that the efficiency of a conventional engine is not independent of its load, that is to say of the throttle opening for a petrol engine. As FIG. 3 shows, with the torque $C_{th}$ of the engine given as ordinates and the speed R of the engine as abscissae, the specific consumption of an engine varies with the speed and the load of the engine. For a given available power $P_{thd}$, the operating point providing the minimum fuel consumption is situated rather in the low engine speeds and, as is known, at high throttle opening.

An advantageous embodiment whose aim is to always tend towards a lower fuel consumption will now be described. It involves advancing the operating point towards a higher engine load without adversely affecting a good response to the accelerator. The means by which the control changes automatically from economical control to dynamic control are proposed below.

Figure 4:
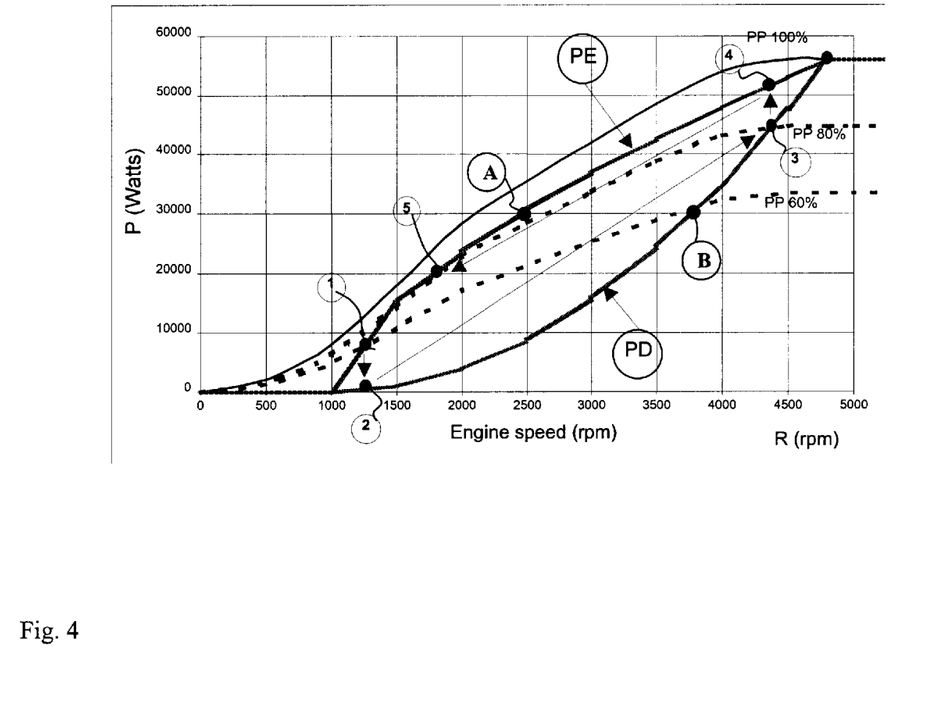
FIG. 4 is a graph showing the power of the engine as a function of its rotational speed, on which various operating points are shown.

Having observed that an operating zone favorable in terms of consumption is situated at a rather low speed and a rather large throttle opening, an economical control power curve PE (also called more simply "economical control"), as plotted in FIG. 4, is also used. In FIG. 4, a control power curve comparable to that of FIG. 2, called dynamic control curve PD, has also been plotted. It can be seen that between the curves PE and PD the same power can be obtained at different operating points.

The control curve PD of FIG. 4 is the same as the control curve P of FIG. 2. On this curve, it can be seen that a power of 30000 watts is obtained at a speed of about 3750 rpm and a throttle position in the region of 60% open (operating point "B"), whereas on the curve PE, it can be seen that the same power of 30000 watts is obtained at a speed of about 2500 rpm and a throttle position in the region of 80% open (operating point "A").

If the programming of the unit 31 for controlling the propulsion torque is based solely on such an economical control curve PE, and the driver finds the need to accelerate, the reaction of the overall drivetrain to an appropriate action on the accelerator control CA is slower than the reaction to the same appropriate action on the accelerator control CA in the case where the programming of the unit 31 for controlling the propulsion torque is based on the dynamic control curve PD. This is because, in the first case, the actuator PP is in a position much closer to the maximum throttle opening than in the second case. The acceleration reserve is much smaller in the case of economical control than in the case of dynamic control. Thus, in the case of economical control, the engine takes much more time to increase its speed and give a higher power. Consequently, the desired torque C increases less rapidly and the vehicle accelerates less powerfully. The response to the accelerator is slow, a little like over the longest speed ratios with a conventional vehicle with a mechanical gearbox.

For this reason, it is proposed, in a very advantageous variant embodiment, to use in fact a set of control curves in order to change automatically and progressively from the dynamic control curve PD to the economical control curve PE, these two curves being the limits of the operation of the drivetrain. This means that the effective control will vary automatically between one limiting mode which optimizes the dynamic character of the response to a demand for acceleration and another limiting mode which optimizes the energy efficiency. The control curve programmed into the unit 31 for controlling the propulsion torque is as follows:

$$P = P\max \cdot \left(\frac{\text{Speed} - \text{Idling speed}}{\text{Max. speed} - \text{Idling speed}}\right)^{Adjustment},$$

where "Adjustment" is an operating parameter, "Speed" is the speed of the engine at the moment of calculation, "Idling speed" is the speed of the engine when idling, "Max. speed" is the speed of the engine used at the point of maximum power.

Preferably, the "Adjustment" parameter is chosen as a function of the characteristic operating curves of the engine used.

By way of non-limiting example, a control is quite correctly defined according to a dynamic control curve PD for a value of the "Adjustment" parameter of the order of 1.5 (=Dyn. adjust.), and a control is quite correctly defined according to an economical control curve PE for a value of the "Adjustment" parameter of the order of 0.7 (=Eco. Adjust.). The values given above are merely for guidance. It is best to determine them, for example experimentally, according to each case. A high value of this parameter corresponds to dynamic control, whereas a low value corresponds to economical control.

When the limiting modes have been determined, the "Adjustment" parameter can very easily be varied automatically in the following manner: the "Adjustment" parameter, from a maximum "Dyn. Adjust." value chosen to ensure dynamic control, always tends towards the "Eco. Adjust." value, except in the case of a demand for acceleration by the driver.

This allows an automatic change to the PE curve when the driver is not accelerating, and an automatic change to the PD curve when the driver is accelerating, and vice versa.

This may be done in real time, while moving, by virtue, for example, of a simple analysis of relevant information for assessing the style in which the driver is driving the vehicle. For example, it is possible to take account of the vehicle speed, the position of the accelerator control CA, and above all the variations of this position, in particular the speeds of variation, the time elapsed since the last variation.

In another variant embodiment, a low limit is introduced for the "Adjustment" parameter in order to give the vehicle great maneuvering flexibility at low speed. The "Adjustment" parameter then varies between a high value called "Dyn. Adjust." and a low value called "Min. adjust.", with "Min. adjust." being calculated as follows:

$$\text{Min. adjust.} = \text{Dyn. adjust.} - \left(v \cdot \frac{\text{Dyn. adjust.} - \text{Econ. adjust.}}{\text{Speed threshold}}\right)$$

where "v" is the instantaneous vehicle speed, whose upper limit is the "Speed threshold".

It has been found that this allows the agreeableness of the vehicle in low-speed maneuvers to be improved. Driving is made more flexible by a control curve remaining rather dynamic at low speed. The speed threshold is fixed between 15 and 30 km/h, for example at 20 km/h. Above the speed threshold, the management of the "Adjustment" parameter allows economical control.

In the following variant embodiment, a practical case of the programming of the unit 31 for controlling the propulsion torque is given which allows the reaction of the drivetrain to be made as dynamic as possible when the driver displays an intention to accelerate powerfully by a rapid variation of the position of the accelerator pedal. The derivative of the position of the accelerator control CA is used to perform this function. The value of this derivative makes it possible to approach the dynamic control curve PD more or less rapidly. After a certain time delay, there is a progressive return to the economical control curve PE.

Let us refer to FIG. 4 again. The operating point ① on the economical control curve PE is taken as the starting point. The throttle opening is 60% and the speed is 1200 rpm, the engine supplying 9000 watts. The driver desires great acceleration, he presses the accelerator pedal suddenly and puts it into a position such that the throttle opening is now 80%. The analysis of the derivative of the signal giving the position of the accelerator pedal over time, for example by comparison with a threshold, has brought about a swing to a more dynamic control curve, that is to say, tending towards a curve such as PD, whereas the throttle is still in the course of changing position. The effectively controlled power is that corresponding to the operating point ②, i.e. 2000 watts. At this time, there is no longer equilibrium between the power supplied by the engine and the power with which the electric traction motors 21 are controlled. The engine therefore increases its speed, thereby allowing the acceleration of the vehicle as explained during the description of FIG. 2.

By way of illustration, the change from the operating point ① to the operating point ② corresponds to changing down with a manual gearbox in an ordinary vehicle. The operating point ③ is rapidly reached. After a judicious time delay, it is possible to return progressively to a more economical control curve. To simplify the explanation, it may be assumed that the control point progresses to the point ④. Again, there is no longer equilibrium between the power supplied by the engine and the power determining the desired torque C. The engine 10 is overloaded. As the unit 31 for controlling the propulsion torque is now working in accordance with the economical control curve PE, the powers will balance at the point ⑤, after a reduction of the speed of the engine 10, with a substantially constant throttle position. In fact, as the changes of control curve are of course continuous, the progression of the operating point is not as abrupt as FIG. 4 which has just been proposed would suggest.

The operation which has just been described may be obtained by the following programming development:

$$\text{Adjustment} = \text{Dyn. adjust.} - \left(v \cdot \frac{\text{Dyn. adjust.} - \text{Eco. adjust.}}{\text{Speed threshold}}\right) \cdot (1 - k)$$

where "v" is the instantaneous vehicle speed, whose upper limit is the "Speed threshold", $$k = \frac{D}{\text{Max. accelerator position derivative}}$$

with D=0 when the first derivative with respect to time of the position of the accelerator control CA is negative or zero, and D=the value of the first derivative of the position of the accelerator control CA when the said derivative is positive, with k limited to 1.

Under certain conditions, the driver may need all the power for a long period. This is the case, for example, when overtaking. It is therefore advantageous to be able to program the unit 31 for controlling the propulsion torque to obtain the "Kick-down" effect well known for the automatic gearboxes of conventional vehicles. The driver displays his intention by depressing the accelerator control CA as far as it will go and by maintaining full depression as long as full power is required.

Of course, the most dynamic control curve possible is used, namely the curve PD. The throttle opening reaches its maximum, within the limits explained above (saturation of the electric traction motor, traction control system, . . . ). And in this case, the parameter k retains the value 1 as long as the driver keeps the accelerator pedal depressed. The maximum-open operating point of the actuator PP is maintained, as long as the accelerator pedal remains depressed.

In a particular embodiment, the electric traction motors may be operated as generators, in order to provide an effect comparable to the engine brake of a conventional vehicle. In this case, the vehicle is equipped with an electrical energy absorption device connected to the said electric line via a braking control unit 14. The braking control unit 14 automatically detects a transfer of energy proceeding in the sense of recovery and directs it into the electrical energy absorption device. Since braking is taking place, the operation of the torque control unit 31 has already put the actuator PP into an idling position (for more details, see the description of FIG. 5 below). As a result, there is absorption of the electrical energy delivered by the said electric traction motor when it operates as an alternator and applies a braking force to the vehicle.

The electrical energy supplied by the electric traction motor(s) 10 when they operate as generators is consumed by a load connected to the electric line 12. Since the invention has the special feature that the control of the drivetrain is designed to be able to operate without a storage battery as a buffer between the alternator 11 and the electric motors 21, the electrical energy absorption device may be a simple electric resistor 140 for dissipating the braking energy. It is proposed that the said predetermined threshold of the accelerator control CA is proportional to the vehicle speed.

Figure 5:
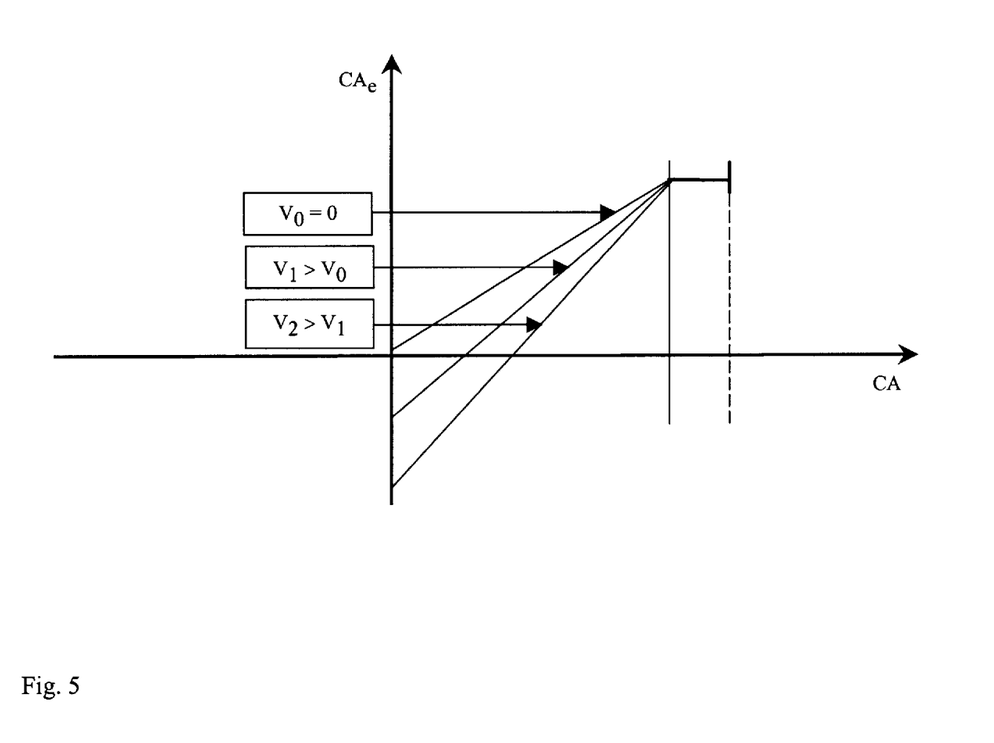
FIG. 5 is a diagram depicting the operation of the accelerator control.

In FIG. 5, the abscissae represent the position of the accelerator control CA at the disposal of the vehicle driver, and the ordinates represent the translation of this position into effective acceleration control $CA_e$ (positive or negative, and quantified). There can be seen a set of curves, each curve corresponding to a vehicle speed. All the curves (except one, corresponding to a zero vehicle displacement speed) have a first part in which the demand for acceleration is negative and variable, a second part in which the demand for acceleration is positive and variable, and finally a third part in which the demand for acceleration is positive and constant.

The positive demands for acceleration allow the torque control unit 31 to determine a desired torque C as explained above. The negative demands for acceleration allow the torque control unit 31 to control the energy absorption device 14, to send a desired "idling" value to the device for controlling the actuator PP (except if other peripheral elements connected to the line 12 demand more electrical energy than the electric motors 21 supply in the engine braking phase), and to send a negative desired torque C, of greater or lesser magnitude, to the inverters 22. The braking torque (as will be recalled, the motors 21 are controlled in terms of torque) is therefore a function of the position of the accelerator pedal and the instantaneous vehicle speed (see FIG. 5). Of course, it is advisable to limit the desired torque C as a function of the maximum current admissible by the electric traction motor(s) 21 and as a function of the maximum power acceptable to the dissipating resistor or an equivalent energy absorption device installed in the vehicle.

The position of the accelerator control CA for which the demand for acceleration is zero is termed the "neutral position". This position depends on the vehicle speed. When the position of the pedal is below the neutral position, the drivetrain operates as an engine brake. Any position of the accelerator control CA of the third part of the curves of FIG. 5 in which the demand for acceleration is positive and constant is termed the "kick-down position". Between the neutral position and the kick-down position, the operation of the drivetrain is that explained above, with automatic and constant adaptation between dynamic control PD and economical control PE. The operation in the kick-down zone has also been explained above.

At zero speed, for example, the neutral is at the zero of the accelerator pedal, so that there is no engine braking zone and therefore no possibility of achieving electric braking. When the vehicle speed increases, the neutral is displaced, the braking zone increases and the traction zone decreases.

Advantageously, in order to facilitate hill starts or to maintain the vehicle on a slope when the accelerator control CA is at rest and the vehicle displacement speed is zero, as long as the vehicle driver does not act on the accelerator control CA, the unit for controlling the propulsion torque calculates a desired torque C so as to maintain the vehicle speed at a zero value.

Of course, to recover the energy on braking, a means for storing electrical energy, such as an electrochemical storage battery, or any equivalent device, could be used. Advantageously, the storage capacity is moderate (so as not to weigh down the vehicle), and the control device 32 tends first of all to empty the battery in the event of a demand for acceleration of the vehicle indicated by the accelerator control CA, before acting on the actuator PP.

What is claimed is:

1. A drivetrain for a series hybrid vehicle, comprising:
   (a) an engine having an output shaft driving an alternator, the engine having a power available at the output shaft of the engine;
   (b) at least one electric traction motor, for generating a propulsion torque, connected to the alternator by an electric line and an inverter, the inverter allowing the electric traction motor to be operated at a desired propulsion torque, the electric line allowing the transfer of an electric traction power;
   (c) an accelerator control CA at the disposal of a vehicle driver to control the power available at the output shaft of the engine;
   (d) an actuator PP acting on the engine;
   (e) a control device controlling the position of the actuator PP as a function of the position of the accelerator control CA, as far as a limitation at least when the desired torque reaches the maximum torque of the electric traction motor; and
   (f) a unit for controlling the propulsion torque of the electric traction motor by continuously calculating the desired propulsion torque as a function of a vehicle speed and as a function of a control power P evaluating the power available at the output shaft of the engine as a function of the actual speed of the engine the power available at the output shaft being a result of the operation of the accelerator control CA by the vehicle driver.

2. A drivetrain according to claim 1, in which the control power P is evaluated as follows:

$$P = P\max \cdot \left(\frac{\text{Speed} - \text{Idling speed}}{\text{Max. speed} - \text{Idling speed}}\right)^{Adjustment},$$

where "Adjustment" is an operating parameter, "Speed" is the speed of the engine at the moment of calculation, "Idling speed" is the speed of the engine when idling, and "Max. speed" is the speed of the engine used at the point of maximum power.

3. A drivetrain according to claim 2, in which the "Adjustment" parameter, from a maximum "Dyn. Adjust." value, tends towards an "Eco. Adjust." value, and rapidly assumes the "Dyn. Adjust." value again in the event of rapid action on the accelerator control CA intending to accelerate the vehicle.

4. A drivetrain according to claim 2, in which the "Adjustment" parameter varies between a high value called "Dyn. Adjust." and a low value called "Min. adjust.", with "Min. adjust." being calculated as follows:

$$\text{Min. adjust.} = \text{Dyn. adjust.} - \left(v \cdot \frac{\text{Dyn. adjust.} - \text{Eco. adjust.}}{\text{Speed threshold}}\right)$$

where "v" is the instantaneous vehicle speed, whose upper limit is the "Speed threshold".

5. A drivetrain according to claim 2, in which the "Adjustment" parameter is calculated as follows:

$$\text{Adjustment} = \text{Dyn. adjust.} - \left(v \cdot \frac{\text{Dyn. adjust.} - \text{Eco. adjust.}}{\text{Speed threshold}}\right) \cdot (1 - k)$$

where "v" is the instantaneous vehicle speed, whose upper limit is the "Speed threshold", $$k = \frac{D}{\text{Max. accelerator position derivative}}$$

with D=0 when the first derivative with respect to time of the position of the accelerator control CA is negative or zero, and D=the value of the first derivative of the position of the accelerator control CA when the said derivative is positive, with k limited to 1.

6. A drivetrain according to claim 1, further comprising an electrical energy absorption device connected to the electric line via a braking control unit, the braking control unit being activated when the accelerator control CA is below a predetermined threshold, so as to order the control unit to send a desired braking torque C to the electric motor and so as to put the actuator PP into an idling position.

7. A drivetrain according to claim 6, in which the predetermined threshold of the accelerator control CA is proportional to the vehicle speed.

8. A drivetrain according to claim 6, in which the electrical energy absorption device comprises a means for storing the electrical energy.

9. A drivetrain according to claim 8, in which the control device tends first of all to empty the electrical energy storing means in the event of a demand for acceleration of the vehicle indicated by the accelerator control CA, before acting on the actuator PP.

10. A drivetrain according to claim 1, in which the control device for controlling the actuator PP continuously calculates, at each iteration, a limit position as follows:

Throttle position limit=Max. throttle position$-k*(P_{thd}-P_a-P_t)$.

11. A drivetrain according to claim 1, in which the unit for controlling the propulsion torque of the vehicle calculates the desired torque in accordance with a chosen sampling period.

* * * * *